US011064409B2

(12) United States Patent
Cedergren et al.

(10) Patent No.: US 11,064,409 B2
(45) Date of Patent: *Jul. 13, 2021

(54) MOBILITY FOR BEAM-FORMING SYSTEMS

(71) Applicant: Telefonaktiebolaget LM Ericsson (publ), Stockholm (SE)

(72) Inventors: Andreas Cedergren, Bjärred (SE); Andres Reial, Malmö (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,861

(22) Filed: Dec. 16, 2019

(65) Prior Publication Data

US 2020/0120565 A1 Apr. 16, 2020

Related U.S. Application Data

(63) Continuation of application No. 15/578,309, filed as application No. PCT/EP2015/063218 on Jun. 12, 2015, now Pat. No. 10,536,885.

(51) Int. Cl.
*H04W 36/06* (2009.01)
*H04W 36/30* (2009.01)
(Continued)

(52) U.S. Cl.
CPC .......... *H04W 36/06* (2013.01); *H04B 7/0408* (2013.01); *H04W 16/28* (2013.01);
(Continued)

(58) Field of Classification Search
CPC ... H04W 36/06; H04W 36/30; H04W 36/305; H04W 36/00; H04W 36/20
See application file for complete search history.

(56) References Cited

U.S. PATENT DOCUMENTS 8,036,669 B2 10/2011 Dong et al.
10,212,629 B2 2/2019 Kishiyama et al.
(Continued)

FOREIGN PATENT DOCUMENTS

JP 2013197876 A 9/2013
JP 2014527367 A 10/2014
(Continued)

*Primary Examiner* — Robert C Scheibel
(74) *Attorney, Agent, or Firm* — Coats & Bennett, PLLC

(57) ABSTRACT

A method for a network node of a cellular communication network is disclosed. The network node and at least some other network nodes of the cellular communication network are each adapted to support a plurality of beams of a signal beam-forming scheme and to communicate with a wireless communication device using at least one of the plurality of beams.

The method comprises identifying one or more candidate beams, causing transmission of a reference signal on each of the candidate beams, causing reservation of an uplink resource of at least one of the candidate beams (wherein the uplink resources are for conveying a report from the wireless communication device, and wherein the report is indicative of a result of measurements of the reference signals), and causing the communication with the wireless communication device to use a target beam (wherein one of the candidate beams is selected as the target beam based on the conveyed report).

A corresponding method for a wireless communication device is also disclosed, as well as a computer program product, respective arrangements for a network node and a wireless communication device, a network node and a wireless communication device.

34 Claims, 2 Drawing Sheets

(51) Int. Cl.
*H04W 36/00* (2009.01)
*H04W 16/28* (2009.01)
*H04B 7/0408* (2017.01)
*H04B 7/06* (2006.01)
*H04W 36/20* (2009.01)

(52) U.S. Cl.
CPC ....... *H04W 36/0079* (2018.08); *H04W 36/30* (2013.01); *H04B 7/0617* (2013.01); *H04W 36/0088* (2013.01); *H04W 36/20* (2013.01)

(56) References Cited

U.S. PATENT DOCUMENTS

| | | |
|---|---|---|
| 2009/0298502 A1 | 12/2009 | Hagerman et al. |
| 2012/0051251 A1 | 3/2012 | Seo et al. |
| 2012/0135677 A1 | 5/2012 | Hsu et al. |
| 2012/0178456 A1 | 7/2012 | Peisa et al. |
| 2013/0121185 A1* | 5/2013 | Li ................. H04W 24/10 370/252 |
| 2013/0286960 A1 | 10/2013 | Li et al. |
| 2014/0073329 A1* | 3/2014 | Kang ............... H04W 36/14 455/439 |
| 2014/0146788 A1 | 5/2014 | Wallentin et al. |
| 2015/0049699 A1 | 2/2015 | Takeda et al. |
| 2015/0230263 A1* | 8/2015 | Roy ................. H04W 64/003 455/452.2 |
| 2016/0007261 A1* | 1/2016 | Oh .................. H04B 7/0695 455/438 |
| 2017/0142604 A1* | 5/2017 | Reial ............... H04W 24/10 |
| 2017/0215117 A1* | 7/2017 | Kwon ............... H04B 7/0617 |

FOREIGN PATENT DOCUMENTS

| | | |
|---|---|---|
| JP | 2014531852 A | 11/2014 |
| WO | 20130028023 A2 | 2/2013 |
| WO | 20130048212 A2 | 4/2013 |
| WO | 2014116928 A1 | 7/2014 |
| WO | 2015080645 A1 | 6/2015 |

\* cited by examiner

MOBILITY FOR BEAM-FORMING SYSTEMS

RELATED APPLICATIONS

This application is a continuation of U.S. patent application Ser. No. 15/578,309, filed Nov. 30, 2017, which is the National Stage of International Application No. PCT/EP2015/063218, filed Jun. 12, 2015, the disclosures of which is incorporated by reference herein in their entirety.

TECHNICAL FIELD

The present invention relates generally to the field of mobility in wireless communication systems. More particularly, it relates to mobility in systems applying signal beam-forming.

BACKGROUND

In a typical cellular communication system, it is important to enable handover functionality. Handover is the process of transferring control over an ongoing connection between a (mobile) wireless communication device and the network providing the cellular communication system from one network node (the serving network node, providing a serving cell) to another network node (the target network node, providing a target cell). Handover is typically provided to accomplish a transparent service for the wireless communication device over a geographical area which extends beyond the coverage area of a single network node. Preferably, a handover should be performed without any (or with minimal) loss of data and without any (or with minimal) interruption in the communication of the ongoing connection.

Enabling of handover functionality typically comprises finding of a suitable target cell and ensuring (or making probable) that it is possible to sustain reliable communication with the found suitable target cell.

Candidate cells (provided by candidate network nodes) for finding of the suitable target cell are typically stored in neighbor lists, which may be stored at the serving network node or elsewhere in (or in association with) the network providing cellular communication system, as suitable.

To evaluate whether it is possible to sustain reliable communication with any of the candidate cells, the quality of a possible connection between the wireless communication device and the candidate cell are typically estimated before a decision to perform a handover takes place. Such estimation may typically be done based on downlink measurements carried out by the wireless communication device on reference signals transmitted by the candidate cells and reported to the serving network node.

In many typical cellular communication systems, each network node continuously transmits reference signals (e.g. pilot signals) that wireless communication devices in neighbor cells may use to estimate the quality of a possible connection with the network node. Examples of such reference signals comprise BCCH (broadcast control channel) in GSM (Global System for Mobile communication), CPICH (common pilot channel) in UMTS (Universal Mobile Telecommunication System), CRS (cell specific reference signal) in UMTS-LTE (UMTS, Long Term Evolution) and beacon signals in the IEEE (Institute of Electrical and Electronics Engineers) 802.11 standards.

Many emerging cellular communication systems may use advanced antenna systems to enable communication in narrow beams directed from the serving network node towards the wireless communication device, so-called beam-forming. Beam-forming may be used to enable high signal strength in the direction of the beam while the interference caused in other directions is kept low. Another advantage of beam-forming is that coverage of a network node may be increased.

In systems employing beam-forming, there is typically a need for a beam switch functionality, typically including switches between beams supported by the same network node as well as switches between beams supported by different network nodes (i.e. handover). In analogy with the established handover terminology, the beam before a beam switch is called the serving beam and the beam that will be used after the beam switch is called the target beam.

Throughout this disclosure, the term beam switch will be used to cover both the case where the serving beam and the target beam are supported by the same network node (i.e. when the beam switch does not involve a handover between network nodes, an intra-node beam switch) and the case where the serving beam and the target beam are supported by different network nodes (i.e. when the beam switch involves a handover between network nodes, an inter-node beam switch).

Transmitting reference signals in all beams continuously to enable measurements for beam switch decisions is not particularly efficient when a beam-forming system has a large number of narrow of beams. One reason is that, in some typical scenarios, only a few (or no) beams supported by a network node are active (e.g. used for a connection with a wireless communication device) and transmitting reference signals in the rest of the beams would only consume power, add interference and require extra hardware resources.

An alternative approach is to have only a subset of candidate beams transmitting reference signals, and only when it is probable that a beam switch (with or without a handover) is needed. Such reference signals may be termed mobility reference signals (MRS) and may, for example, have a similar physical structure to a secondary synchronization signal (SSS) as defined in UMTS-LTE or any other suitable signal structure.

To determine when it is probable that a beam switch is needed, the serving network node may use uplink measurements (typically making some assumptions regarding reciprocity) and/or channel quality reports from the wireless communication device regarding the connection. When the serving node determines that it is probable that a beam switch is needed it may trigger a mobility procedure, where the candidate beams transmit reference signals and the wireless communication device can perform and report measurements of the reference signals to the serving network node for the beam switch decision. The serving network node may inform the wireless communication device about the timing (e.g. start and/or end) and/or content (e.g. signal sequences) of the reference signals in association with triggering the mobility procedure.

Which beams to use as candidate beams may, for example, be based on content of a database (e.g. a mobility look-up table, LuT). Such a database may (in analogy with the neighbor cell list) comprise information regarding candidate beams for each serving beam and/or for each geographical location of the wireless communication device. The database may be formed and/or up-dated in any suitable way. For example, it may be based on system set-up parameters and/or on statistics regarding previous beam switches and/or measurements. The candidate beams for a serving beam may, for example, comprise beams that have been used before and/or after a beam switch to/from the serving beam, beams that have been associated with strong reference signal measurements for the serving beam, and/or beams adjacent to the serving beam and supported by the serving network node. The candidate beams for a geographical position may, for example, comprise beams that have been associated with strong reference signal measurements for the geographical position, and/or any combination with information regarding serving beam. The database may, additionally, comprise (average) signal levels of the reference signals for some of the candidate beams (e.g. the strongest) based on earlier measurements for each serving beam and/or geographical position.

One problem with beam-forming systems (especially systems with narrow beams) is that in some situations, the signal power (and typically the signal-to-interference ratio) may decrease a lot during a very short time span. This time span may be so short that there is not enough time to determine that it is probable that a beam switch is needed, to trigger a mobility procedure and to complete a beam switch. Thus, the connection between the wireless communication device and the network may be lost (e.g. due to out-of-sync and subsequent radio link failure).

FIG. 1 illustrates an example scenario where a sudden drop of the signal strength may be experienced such that there is not enough time to prepare for and carry out a beam switch as needed.

In FIG. 1, a wireless communication device has an ongoing connection with network node 120 via beam 110 when the wireless communication device is in position 100a. When the wireless communication device moves around a corner of a building 130 it ends up in a new position 100b where signals of the beam 110 cannot reach it (or reaches it with a very low signal level) due to shadowing by the building 130. Furthermore, interfering beams 111 (from network node 120, reflected of the building 131) and 112 (from network node 121) may be received at high signal levels by the wireless communication device in position 100b, which results in a low signal-to-interference ratio.

Since the process of moving around the corner may be fast, the signal power of beam 110 (and the signal-to-interference ratio) may drop very quickly and the connection between the wireless communication device and the network may be lost as explained above.

Thus, there is a need for improved (or at least alternative) approaches to mobility in cellular communication systems employing beam-forming.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The inventors have realized that the measurement report may be transmitted by the wireless communication device and received by the network using a beam other than the serving beam to lower the risk of losing the connection between the wireless communication device and the network.

According to a first aspect, this is enabled by a method for a network node of a cellular communication network. The network node and at least some other network nodes of the cellular communication network are each adapted to support a plurality of beams of a signal beam-forming scheme and to communicate with a wireless communication device using at least one of the plurality of beams (the serving beam(s)).

The method comprises identifying one or more candidate beams and causing transmission of a reference signal on each of the candidate beams.

The method also comprises causing reservation of an uplink resource of at least one of the candidate beams (wherein the uplink resources are for conveying a report from the wireless communication device, and wherein the report is indicative of a result of measurements of the reference signals) and causing the communication with the wireless communication device to use a target beam, wherein one of the candidate beams is selected as the target beam based on the conveyed report.

The signal beam-forming scheme may, for example, be a MIMO (multiple-input, multiple-output) scheme, a massive-MIMO scheme, or any beam-forming scheme employing narrow beams. A beam-forming scheme employing narrow beams may, for example, be defined as a beam-forming scheme where a network node supports at least 50, 100 or 200 beams in different directions.

The case where network nodes of the cellular communication network are each adapted to support a plurality of beams of a signal beam-forming scheme and to communicate with a wireless communication device using at least one of the plurality of beams is used as a non-limiting example in this disclosure.

Communication with the wireless communication device using at least one of the plurality of beams may comprise using one or more of the plurality of beams. In this disclosure, the case where communication with the wireless communication device uses one of the plurality of beams is used as a non-limiting example.

The identification of the candidate beams may, for example, be accomplished using the database described in the background section.

Reservation of an uplink resource of at least one of the candidate beams may comprise reservation of an uplink resource of each of the candidate beams. More generally, reservation of an uplink resource of at least one of the candidate beams may comprise reservation of an uplink resource of a number of the candidate beams, wherein the number is any number between one and the number of identified candidate beams. In this disclosure, the case where reservation of an uplink resource of each of the candidate beams is used as a non-limiting example.

Causing the communication with the wireless communication device to use a target beam may comprise causing a beam switch (which may or may not include a handover to another network node). The beam switch (possibly including a handover) may be controlled by the network node supporting the serving beam, or it may be controlled by a network node supporting the target beam, or (in a more general case) by a network node supporting any of the candidate beams.

The selection of one of the candidate beams as the target beam may be performed by the network node supporting the serving beam, or it may be performed by a network node supporting the target beam, or (in a more general case) by a network node supporting any of the candidate beams (typically the network node receiving the report from the wireless communication device).

In some embodiments, the method may further comprise detecting a decreasing signal quality. A decreasing signal quality may be detected in any suitable way, for example, via uplink measurements (e.g. decreasing signal-to-interference ratio or signal-to-interference ratio being below a threshold) or via channel quality reports (e.g. channel quality indication—CQI—or channel state information—CSI) from the wireless communication device.

Additionally or alternatively, the method may, according to some embodiments, further comprise detecting a signal environment statistics of a location of the wireless communication device indicating that a signal-to-interference ratio of the location is below a signal-to-interference ratio threshold. The statistics may, for example, be acquired using the database described in the background section.

Additionally or alternatively, the method may, according to some embodiments, further comprise detecting a failure of a mobility procedure. Detecting a failure of the mobility procedure may, for example, comprise detecting absence of an expected signal (e.g. a message or acknowledgement message of the mobility procedure), detecting out-of-sync or detecting radio link failure.

At least the causing of reservation of uplink resources may, according to some embodiments, be performed in response to detecting either or any combination of (as applicable) the decreased signal quality, the signal environment statistics indicating the signal-to-interference ratio being below the signal-to-interference ratio threshold, and the failure of the mobility procedure. In some embodiments, either or both of identifying one or more candidate beams and causing transmission of a reference signal on each of the candidate beams may also be performed in response there to.

In some embodiments, the method may further comprise causing transmission of an indication regarding the reservation of uplink resources to the wireless communication device.

In some embodiments, the indication regarding the reservation of uplink resources is (implicitly) provided to the wireless communication device via transmission of the reference signals. In some of these embodiments, transmission of a reference signal is only done if a suitable uplink resource for conveying the report has been done.

In some examples, the reference signals may be structured into groups where the group identity implies to which network node the report should be conveyed.

According to some embodiments, the selection of one of the candidate beams as the target beam comprises selection of the one of the candidate beams on which the report is conveyed in the reserved uplink resource.

For a candidate beam supported by the network node, causing transmission of the reference signal on the candidate beam may comprise transmitting the reference signal and causing reservation of the uplink resource on the candidate beams may comprise reserving the uplink resource.

For a candidate beam supported by an other, candidate beam supporting, network node, causing transmission of the reference signal on the candidate beam may comprise transmitting a reference signal request to the candidate beam supporting network node and causing reservation of the uplink resource on the candidate beams may comprise transmitting an uplink resource request to the candidate beam supporting network node.

In some embodiments, causing the communication with the wireless communication device to use a target beam comprises causing transmission of a beam switch command to the wireless communication device.

Causing transmission of a beam switch command to the wireless communication device may, for example, comprise transmitting the beam switch command to the wireless communication device (e.g. if the target beam is supported by the network node).

If the target beam is supported by an other, target beam supporting, network node, causing transmission of a beam switch command to the wireless communication device may, for example, comprise performing a handover of the wireless communication device to the target beam supporting network node.

Performing a handover of the wireless communication device to the target beam supporting network node may, according to some embodiments, comprise causing the target beam supporting network node to transmit a handover command to the wireless communication device. The handover command may be a beam switch command in that it may comprise an indication of which beam is the target beam.

A second aspect is a method for a wireless communication device adapted to communicate with a network node of a cellular communication network, wherein the network node and at least some other network nodes of the cellular communication network are each adapted to support a plurality of beams of a signal beam-forming scheme and to communicate with the wireless communication device using at least one of the plurality of beams.

The method comprises performing measurements of reference signals received on each of one or more identified candidate beams (wherein at least one of the one or more identified candidate beams has a reserved uplink resource for conveying a report from the wireless communication device) and transmitting the report in one of the reserved uplink resources, wherein the report is indicative of a result of the measurements, wherein the report is for selection of one of the candidate beams as a target beam, and wherein the target beam is for use in communication with the cellular communication network.

In some embodiments, the report is transmitted in a reserved uplink resource of a candidate beam, which is an other beam than the serving beam.

The reference signals may, additionally, be used to determine synchronization and/or timing of the transmission of the report according to some embodiments.

In some embodiments, the method of the second aspect is performed by the wireless communication device in association with the network node performing the method according to the first aspect.

In some embodiments, the method of the second aspect comprises receiving an indication regarding the reservation of uplink resources from the cellular communication network.

In some embodiments, the method of the second aspect comprises receiving information regarding the reference signals (e.g. timing and/or content) from the cellular communication network and performing the measurements in response there to.

In some embodiments, the method of the second aspect comprises detecting a failure of a mobility procedure. Detecting a failure of the mobility procedure may, for example, comprise detecting absence of an expected signal (e.g. a message or acknowledgement message of the mobility procedure), detecting out-of-sync or detecting radio link failure. The measurements may be performed in response to such detection (either blindly with regard to the reference signals of the candidate beams or based on a most recent information regarding the reference signals of the candidate beams).

The report may, according to some embodiments, be transmitted in the reserved uplink resource of a candidate beam to be selected as the target beam.

The method may, according to some embodiments, comprise receiving a beam switch command from the cellular communication network. In some embodiments, the beam switch command may comprise a handover command (if the target beam is supported by a network node other than the serving beam supporting network node, i.e. a target beam supporting network node).

A third aspect is a computer program product comprising a computer readable medium, having thereon a computer program comprising program instructions. The computer program is loadable into a data-processing unit and adapted to cause execution of the method according to any of the first and second aspect when the computer program is run by the data-processing unit.

A fourth aspect is an arrangement for a network node of a cellular communication network, wherein the network node and at least some other network nodes of the cellular communication network are each adapted to support a plurality of beams of a signal beam-forming scheme and to communicate with a wireless communication device using at least one of the plurality of beams.

The arrangement comprises a controller adapted to cause identification of one or more candidate beams, transmission of a reference signal on each of the candidate beams, reservation of an uplink resource of at least one of the candidate beams (wherein the uplink resources is for conveying a report from the wireless communication device, and wherein the report is indicative of a result of measurements of the reference signals) and the communication with the wireless communication device to use a target beam (wherein one of the candidate beams is selected as the target beam based on the conveyed report).

The fourth aspect may additionally have features identical with or corresponding to any of the various features as explained above for the first aspect.

A fifth aspect is a network node of a cellular communication network comprising the arrangement according to the fourth aspect.

A sixth aspect is an arrangement for a wireless communication device adapted to communicate with a network node of a cellular communication network, wherein the network node and at least some other network nodes of the cellular communication network are each adapted to support a plurality of beams of a signal beam-forming scheme and to communicate with the wireless communication device using at least one of the plurality of beams.

The arrangement comprises a controller adapted to cause performing of measurements of reference signals received on each of one or more identified candidate beams (wherein at least one of the one or more identified candidate beams has a reserved uplink resource for conveying a report from the wireless communication device) and transmission of the report in one of the reserved uplink resources, wherein the report is indicative of a result of the measurements (wherein the report is for selection of one of the candidate beams as a target beam, and wherein the target beam is for use in communication with the cellular communication network).

The sixth aspect may additionally have features identical with or corresponding to any of the various features as explained above for the second aspect.

A seventh aspect is a wireless communication device comprising the arrangement according to the sixth aspect.

An eighth aspect is a method for a network node of a cellular communication network. The network node and at least some other network nodes of the cellular communication network are each adapted to support a plurality of beams of a signal beam-forming scheme and to communicate with a wireless communication device using at least one of the plurality of beams (the serving beam).

The method comprises identifying one or more candidate beams, causing transmission of a reference signal on each of the candidate beams, and causing the communication with the wireless communication device to use a target beam, wherein one of the candidate beams is selected as the target beam based on a report from the wireless communication device, and wherein the report is indicative of a result of measurements of the reference signals.

Causing the communication with the wireless communication device to use a target beam comprises causing transmission, on the target beam, of a beam switch command to the wireless communication device.

Causing transmission of a beam switch command to the wireless communication device may comprise transmitting the beam switch command to the wireless communication device if the target beam is supported by the network node.

Causing transmission of a beam switch command to the wireless communication device may comprise performing a handover of the wireless communication device to the target beam supporting network node if the target beam is supported by an other, target beam supporting, network node.

Performing a handover of the wireless communication device to the target beam supporting network node may, according to some embodiments, comprise causing the target beam supporting network node to transmit a handover command to the wireless communication device. The handover command may be a beam switch command in that it may comprise an indication of which beam is the target beam.

Other aspects are a computer program product, an arrangement and a network node having features identical with or corresponding to those of the eighth aspect.

In some embodiments, any of the above aspects may additionally have features identical with or corresponding to any of the various features as explained above for any of the other aspects, as suitable.

An advantage of some embodiments is that the possibility to complete a beam switch (or any other appropriate part of a mobility procedure) is improved.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described in which a beam-forming system applies an approach where a measurement report of a mobility procedure may be sent from the wireless communication device to the network on a beam other than the serving beam (typically the prospect target beam) to enable a mobility procedure being carried out.

This is particularly beneficial when the signal-to-interference ratio (SIR) of the serving beam drops drastically, such that there is not enough time to carry out the mobility procedure before the signal-to-interference ratio is so bad that reliable communication via the serving beam is not possible. Thus, the approach may be seen as a very fast link recovery process.

Figure 1:
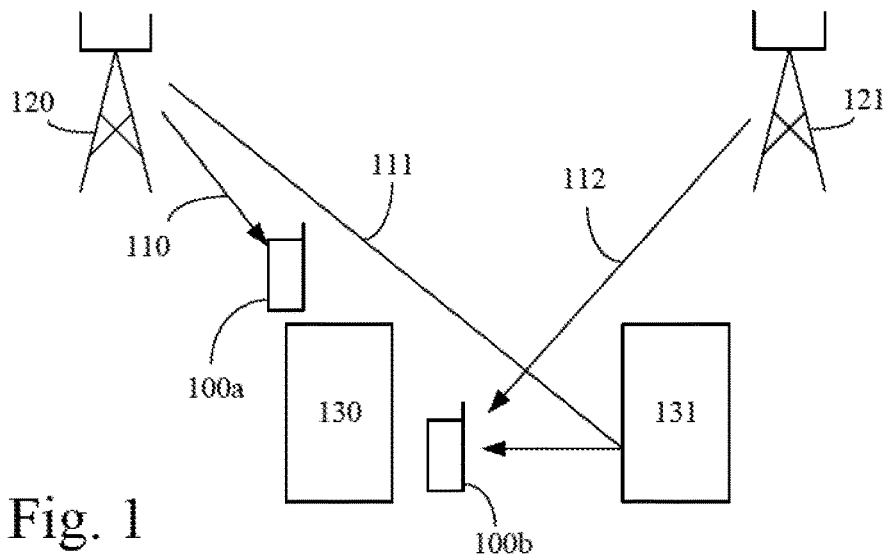
FIG. 1 is a schematic drawing illustrating an example scenario where some embodiments may be applicable.
Figure 2:
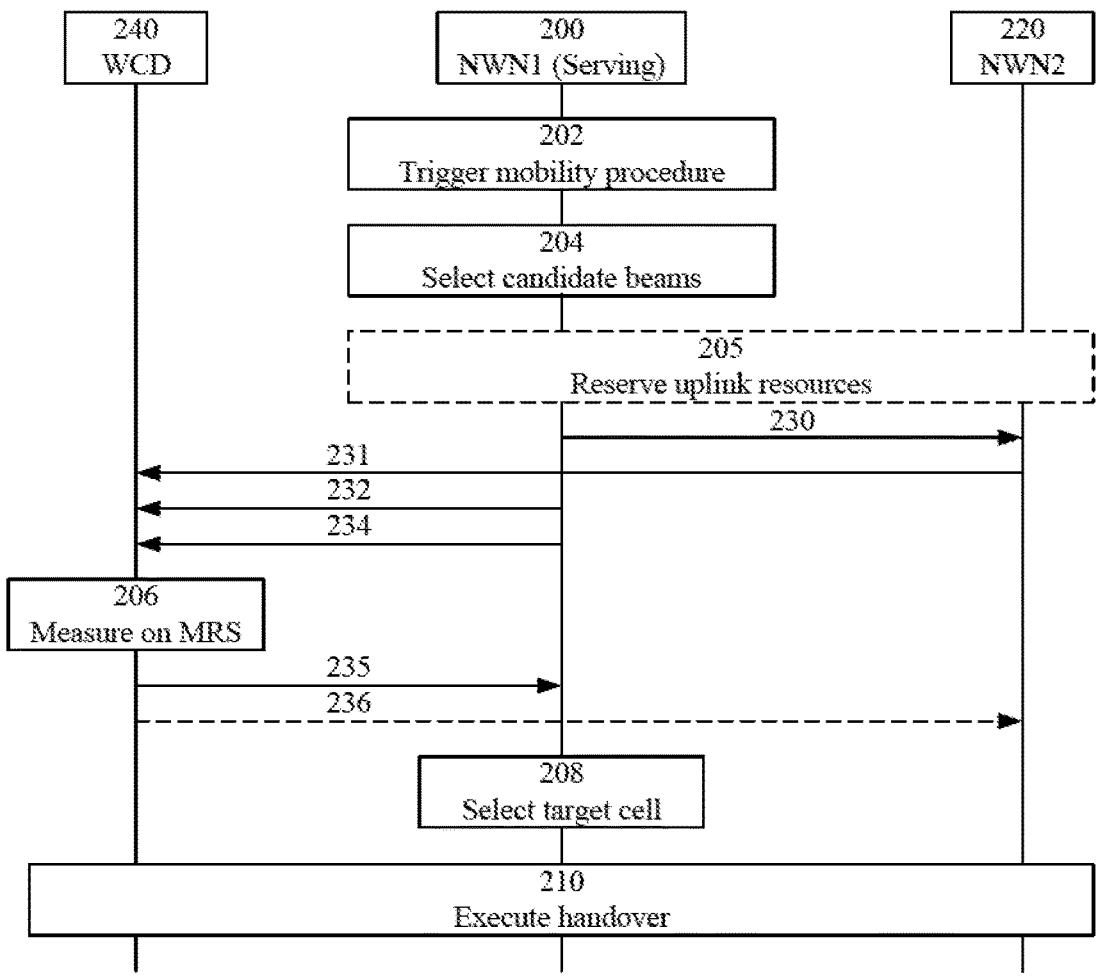
FIG. 2 is a signaling diagram illustrating example signaling and method steps according to some embodiments.

FIG. 2 illustrates example signaling and method steps of a network node (NWN1, compare with network node 120 of FIG. 1) 200 supporting the serving beam, a wireless communication device (WCD, compare with the wireless communication device 100*a*, 100*b* of FIG. 1) 240, and another network node (NWN2, compare with network node 121 of FIG. 1) 220.

During transmission of data from the network node 200 to the wireless communication device 240 via the serving beam, the wireless communication device 240 may send signal quality indications to the network node 200. The signal quality indications may be transmitted in a regular fashion (e.g. CQI, CSI, etc.) and/or when the wireless communication device detects that the signal quality is low/decreasing (e.g. SIR below a threshold, expected message—e.g. ACK/NAK—not received, inability to decode received data, etc.).

When the network node 200 detects decreasing/low signal quality (e.g. based on SIR measurements, received CSI, received CQI, or similar) or when the network node 200 receives an indication that the wireless communication device 240 has detected decreasing/low signal quality, the network node 200 may initiate a mobility procedure in step 202.

Execution of the mobility procedure is represented in FIG. 2 by selection by the network node 200 of candidate beams (e.g. from a database as described above) in step 204, activating MRS (mobile reference signal) on each of the candidate beams (which may include transmitting a request for MRS signaling 230 to other network nodes supporting candidate beams), MRS signaling 231, 232 by the candidate beams, measurement configuration 234 of the wireless communication device, measurements on the MRS by the wireless communication device 240 in step 206, reporting MRS measurements 235 to the network node 200 supporting the serving beam, taking a beam switch decision by the network node supporting the serving beam 200 including selection of target beam in step 208, and performing the beam switch 210 as applicable (which may include a handover to another network node depending on which network node supports the target beam of the beam switch). Numerous variations compared to the execution of the mobility procedure described here may be envisioned. For example, other steps and/or signals may also be present (e.g. acknowledgement of measurement configuration 234, MRS request 230, report 235, signaling in connection to the beam switch/handover, etc.).

As explained above, FIG. 1 describes a scenario where the signal-to-interference ratio drops very quickly due to a sudden shadowing effect (moving around a corner in the example of FIG. 1). If this happens during execution of the mobility procedure (e.g. as described in FIG. 2), there may not be enough time to carry out the mobility procedure before the signal-to-interference ratio is so bad that reliable communication via the serving beam is not possible (e.g. radio link failure, RLF). For example, the connection may be lost before a beam switch command has been transmitted (to the wireless communication device) and acknowledged, before the report 235 has been transmitted (by the wireless communication device) and acknowledged, before the measurement configuration of the wireless communication device and acknowledgement thereof, etc.

Therefore, uplink resources (for conveying the measurement report 235) are reserved, according to some embodiments, on some or all of the candidate beams as illustrated by step 205. Step 205 may be performed by the serving network node 200 and/or by another network node 220 (e.g. the one supporting a candidate beam or a separate network node comprising a scheduler). Information regarding the reserved uplink resources may be communicated to the wireless communication device 240 (e.g. in the measurement configuration 234, in the MRS signaling 231, 232, or in a separate message). The report of the MRS measurements may then be sent on one or more of the reserved uplink resources. Thus, depending on whether the candidate beam having the reserved uplink resource is supported by the serving node 200 or another network node 220, the report may be sent to the serving node as illustrated by 235 or to another network node as illustrated by 236. A beam switch command of step 210 may be transmitted to the wireless communication device using one of the candidate beams (e.g. the target beam).

Figure 3:
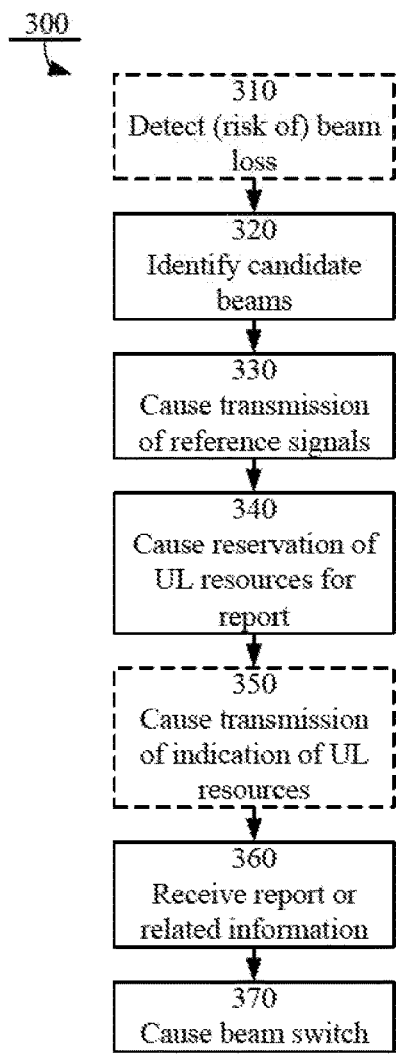
FIG. 3 is a flowchart illustrating example method steps according to some embodiments.

FIG. 3 illustrates and example method 300 according to some embodiments. The method 300 is for a network node (e.g. network node 120 of FIG. 1 and/or network node 200 of FIG. 2) of a cellular communication network, wherein network nodes of the cellular communication network are each adapted to support a plurality of beams of a signal beam-forming scheme and to communicate with a wireless communication device (e.g. wireless communication device 100*a*, 100*b* of FIG. 1 and/or wireless communication device 240 of FIG. 2) using one of the plurality of beams.

In step 310, a loss of the serving beam (or a risk thereof) is detected. The detection may, for example, comprise lack of receipt of an expected message according to an ongoing mobility procedure (compare with the mobility procedure of FIG. 2), and/or detection of a decreasing/low signal quality (e.g. based on uplink signal-to-interference—SIR—measurements, received quality indications such as CQI—channel quality indication—or CSI—channel state information—from the wireless communication device, notification from the wireless communication device of decoding problem, etc.). Alternatively or additionally, the detection of step 310 may be based on statistics (e.g. of the database described above) regarding SIR and/or RLF at a current location of the wireless communication device.

In step 320 one or more candidate beams for the mobility procedure are identified (compare with step 204 of FIG. 2) and reference signals are transmitted thereon (compare with 230, 231, 232 of FIG. 2).

In some embodiments, one or more of steps 320 and 330 may be performed before step 310.

When loss of the serving beam (or a risk thereof) is detected, step 310, uplink resources are reserved on each of the candidate beams as illustrated by step 340 (compare with step 205 of FIG. 2). Step 340 may be performed before step 330 in some embodiments.

An indication of the reserved uplink resources may be conveyed to the wireless communication device (e.g. as part of the reference signaling) according to step 350 or may be implied to the wireless communication device.

The wireless communication device performs measurements on the reference signals (compare with step 206 of FIG. 2) and transmits a measurement report to the network (compare with 235, 236 of FIG. 2). Since the link of the serving beam is lost (or very week), the report is transmitted using one or more of the reserved uplink resources. Typically, the uplink resource of the candidate beam showing the most promising measurements may be used to transmit the report.

In step 360, the report is either received directly by the network node if it is transmitted on a beam supported by that network node, or the report or an indication of its content may be received from another network node that supports the beam on which the report was transmitted.

A beam switch to the most promising beam (the target beam, selected from the candidate beams based on the report) is then conducted in step 370 as applicable (compare with steps 208 and 210 of FIG. 2).

Steps 330 and 340 may differ somewhat for candidate beams supported by the network node carrying out the method 200 and for candidate beams supported by another network node. In the first case, the network node simply reserves the uplink resource and transmits the reference signal on the candidate beam. In the second case, the reservation of the uplink resource and the transmission of the reference signal involve signaling between the serving network node and the network node supporting the candidate beam (e.g. instructions/requests from the serving network node to reserve uplink resources and transmit the reference signal and acknowledgements thereof from the other network node).

The beam switch decision and/or the beam switch control (e.g. transmission of a beam switch (possibly including handover) command to the wireless communication device) may be performed by the serving network node or by another network node.

In the case where the measurement report is received on a beam supported by the serving network node, the beam switch decision is typically made by the serving network node. On the other hand, if the measurement report is received on a beam supported by another network node than the serving network node, the beam switch decision may be made by that network node or by the serving network node (after conveying the measurements report content to the serving network node).

The beam switch command is typically transmitted using the target beam. If the target beam (or more generally, the beam to be used for the beam switch command) is on another network node than the one making the beam switch decision, suitable signaling between the two involved network nodes is implied.

Generally, the beam switch may be performed without explicit involvement of the wireless communication device, i.e. without sending any beam switch command at all to the wireless communication device.

Also generally, a timer function may be implemented after the measurement process is completed (e.g. after step 350 or 360) which is to be applied if no suitable target beam is found based on the measurements. Such a timer function may have an associated maximum time that is, typically known to both the network and the wireless communication device. Searching for a suitable target beam may continue until the maximum time has elapsed, and then a radio link failure occurs.

Figure 4:
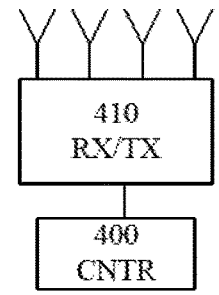
FIG. 4 is a block diagram illustrating an example arrangement according to some embodiments.
Figure 5:
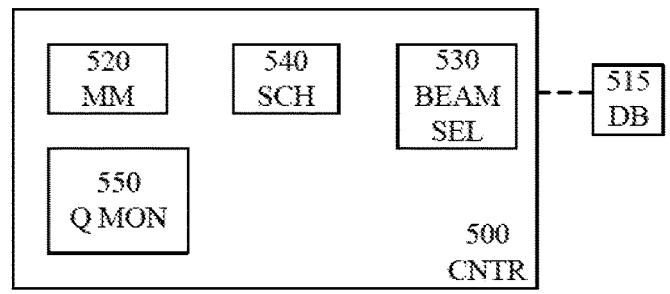
FIG. 5 is a block diagram illustrating an example arrangement according to some embodiments.

FIGS. 4 and 5 illustrate example arrangements for a network node (e.g. network node 120 of FIG. 1) of a cellular communication network, wherein network nodes of the cellular communication network are each adapted to support a plurality of beams of a signal beam-forming scheme and to communicate with a wireless communication device (e.g. wireless communication device 100*a*, 100*b* of FIG. 1) using one of the plurality of beams. The arrangements of FIGS. 4 and 4 may, for example, be adapted to execute (or at least cause execution of) the various method steps described in connection to FIG. 3.

The arrangement of FIG. 4 comprises a controller (CNTR) 400 operatively connected to a transceiver (RX/TX) 410 for transmission and reception of suitable signals, which transceiver may or may not be comprised in the arrangement.

FIG. 5 shows an example controller (CNTR) 500 which may or may not be an implementation of the controller 400 of FIG. 4.

The controller 500 may comprise a mobility manager (MM) 520 adapted to initiate and control a mobility procedure.

The controller 400, 500 is adapted to detect (risk of) loss of a connection supported by a serving beam (compare with step 310 of FIG. 3).

The controller 500 may comprise a quality monitor (Q MON) 550 adapted to monitor a signal quality of the communication link, where detection of a risk of losing a connection may comprise detection of a decreasing (or low) signal quality.

Alternatively or additionally, the controller 500 may be associated with a database (DB) 515 comprising information as described above. The information in the database may be used to detect (risk of) loss of a connection as explained above.

Yet alternatively or additionally, the mobility manager 520 may be adapted to detect loss of a connection by detecting lack of an expected signal according to an ongoing mobility procedure.

The controller 400, 500 is also adapted to cause identification of one or more candidate beams (compare with step 320 of FIG. 3). For example, the controller 400, 500 may be adapted to identify the candidate beams. To this end, the controller 500 may comprise a beam selector (BEAM SEL) 530 adapted to identify the candidate beams. The controller 400, 500 is further adapted to cause transmission of (e.g. transmit) a reference signal on each of the candidate beams (compare with step 330 of FIG. 3).

As explained above, the candidate beams may be provided by a database (DB) 515. The database may be comprised in, or otherwise associated with, the network node. For example, the database may be a cloud-based service shared by some or all of the network nodes of the cellular communication system.

The controller 400, 500 is also adapted to cause reservation of the uplink resource of each of the candidate beams as explained above (compare with step 340 of FIG. 3). To this end the controller 500 may comprise a scheduler (SCH) 540 adapted to reserve the uplink resources for candidate beams supported by the serving network node.

The controller 400, 500 is further adapted to cause the communication with the wireless communication device to use a target beam (compare with step 370 of FIG. 3), wherein one of the candidate beams is selected as the target beam based on the conveyed report as explained above.

An arrangement for a wireless communication device adapted to communicate with a network node of a cellular communication network as described above may also comprise a controller. The controller may be adapted to cause the wireless communication device to perform measurements of reference signals received on each of one or more identified candidate beams and to transmit a report indicative of a result of the measurements in a reserved uplink resource of one of the candidate beams A few examples of different variations of the above-described embodiments will now be given.

In active mode, the wireless communication device continuously receives and decodes control information and data information and estimates the SIR of the connection. As part of a mobility procedure, the network provides the wireless communication device with candidate beams to measure on. The wireless communication device may detect that the connection via the serving beam is lost if, for example, the control signal cannot be decoded or the estimated SIR is below a threshold. The network may detect that the connection via the serving beam is lost if, for example, the wireless communication device report so (providing only the downlink is bad) or uplink transmissions cannot be successfully decoded.

As can be seen in FIG. 2 and the related text, several messages need to be transmitted from the network node supporting the serving beam to the wireless communication device and vice versa. When there is a sudden loss of the serving radio link, the sequence of messages may be interrupted at various points, for example:

1. The serving node does not receive an acknowledgment of the measurement configuration 234. This may imply to the serving node that the measurement configuration was not received by the wireless communication device or that the acknowledgment was transmitted by the wireless communication device but not received.
2. The measurement report 235 is not received by the serving node. In this case, the serving node does not know the quality of the candidate beams.
3. The wireless communication device does not receive an acknowledgment of the measurement report 235. In this case, the wireless communication device knows the quality of the candidate beams, but it is not clear to the wireless communication device whether the serving node has received that information.
4. The serving node does not receive an acknowledgment of a handover (or beam switch) command from the wireless communication device. This may imply to the serving node that the handover command was not received by the wireless communication device or that the acknowledgment was transmitted by the wireless communication device but not received. In this case, the wireless communication device does not know to which beam it should switch, or what radio resources it should use.

Without application of embodiments described herein the wireless communication device typically must perform a normal random access procedure to restore the connection if any of the events occurs. Such a random access procedure is typically quite time consuming and not desirable in these circumstances.

Since the mobility procedure is interrupted if any of the events occurs, not all messages can be transmitted from the serving node to the wireless communication device and vice versa. Thus, the information needs to be otherwise made available.

If the process is interrupted, one or more of the following steps may be applied by the serving node:

Request retransmission of the MRS on the candidate beams (compare with step 330 of FIG. 3).
Reserve uplink resources on candidate beams for measurement report (compare with step 340 of FIG. 3).
Optionally, send indication of reserved resources to the wireless communication device in the MRS (compare with step 350 of FIG. 3).
When the measurement report is received, send beam switch command on target beam.

If the interruption is according to event 1 or 2 described above, the above steps may be performed for all candidate beams, if the interruption is according to event 3 described above, the above steps may be performed for all, some, or only one of the candidate beams (typically for the strongest as indicated by the report), and if the interruption is according to event 4 described above, the above steps (or at least the last one) may be performed for all, some, or only one of the candidate beams (typically only for the selected beam).

If the process is interrupted, one or more of the following steps may be applied by the wireless communication device:

Do (or redo) measurements on the candidate beams.
Send report on an uplink resource indicated in the MRS of one of the candidate beams (typically the strongest).
Listen for beam switch command on candidate beams.

If the interruption is according to event 1 described above, the measurements may be performed blindly or using a most recent candidate beam list available to the wireless communication device. If the interruption is according to event 2 or 3 described above, the measurements may be performed starting with the strongest candidate beam according to the previous measurement. If the interruption is according to event 4 described above, the measurements may (if performed at all) be performed starting with the strongest candidate beam according to the previous measurement.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments. The electronic apparatus may, for example, be a mobile radio communication equipment, a mobile telephone, a base station, a base station controller, a communicator, an electronic organizer, a smartphone, a computer, a notebook, or a mobile gaming device.

Figure 6:
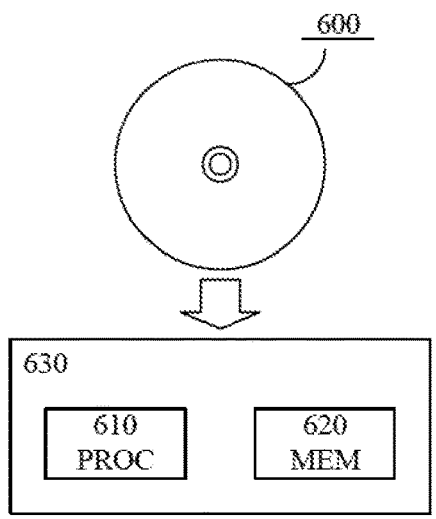
FIG. 6 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 600 illustrated in FIG. 6. The computer readable medium may have stored thereon a computer program comprising program instructions. The computer program may be loadable into a data-processing unit (PROC) 610, which may, for example, be comprised in a wireless communication device or a network node 630. When loaded into the data-processing unit, the computer program may be stored in a memory (MEM) 620 associated with or integral to the data-processing unit. According to some embodiments, the computer program may, when loaded into and run by the data-processing unit, cause the data-processing unit to execute method steps according to, for example, the methods shown in any of the FIGS. 2 and 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

What is claimed is:

1. A method implemented by a network node in a beam-forming network to support beam-switching for communication with a wireless device, the method comprising:
   identifying one or more candidate beams for a beam switch;
   causing transmission of a reference signal on each of the candidate beams;
   causing reservation of an uplink resource on at least one of the candidate beams for transmission of a measurement report by the wireless device; and
   causing the communication with the wireless device to switch from a current beam to a target beam, wherein one of the candidate beams is selected as the target beam based on the measurement report.

2. The method of claim 1, wherein causing the reservation of the uplink resource is performed in response to detecting a decreased signal quality.

3. The method of claim 1, wherein at least the causing the reservation of the uplink resource is performed in response to detecting one or more signal environment statistics of a location of the wireless device indicating that a signal-to-interference ratio of the location is below a signal-to-interference ratio threshold.

4. The method of claim 1, wherein causing the reservation of the uplink resource is performed in response to detecting a failure of a mobility procedure.

5. The method of claim 1, further comprising causing transmission of an indication regarding the reservation of uplink resources to the wireless device.

6. The method of claim 1, further causing an indication of the selected target beam to be sent in the reserved uplink resource.

7. The method of claim 1, wherein, for a candidate beam supported by the network node:
   causing transmission of the reference signal on the candidate beam comprises transmitting the reference signal; and
   causing reservation of the uplink resource on the candidate beams comprises reserving the uplink resource.

8. The method of claim 1, wherein, for a candidate beam supported by another network node:
   the causing transmission of the reference signal on the candidate beam comprises transmitting a reference signal request to the candidate beam supporting network node; and
   the causing reservation of the uplink resource on the candidate beams comprises transmitting an uplink resource request to the candidate beam supporting network node.

9. The method of claim 1, wherein the causing the communication with the wireless device to switch from the current beam to the target beam comprises causing transmission of a beam switch command to the wireless device.

10. The method of claim 9:
    wherein the target beam is supported by the network node; and
    wherein the causing the transmission of the beam switch command to the wireless device comprises transmitting the beam switch command to the wireless device.

11. The method of claim 9:
    wherein the target beam is supported by another target beam supporting network node; and
    wherein the causing the transmission of the beam switch command to the wireless device comprises performing a handover of the wireless device to the target beam supporting network node.

12. The method of claim 11, wherein the performing a handover of the wireless device to the target beam supporting network node comprises causing the target beam supporting network node to transmit a handover command to the wireless device.

13. A method implemented by a wireless device in a beam-forming network for switching from a current beam to a target beam, the method comprising:
    performing measurements of reference signals received on each of one or more candidate beams for a beam switch; and
    transmitting a measurement report including the reference signal measurements to the wireless communication network on reserved uplink resources on one or more of the candidate beams.

14. The method of claim 13, further comprising receiving an indication regarding the reservation of uplink resources from the cellular communication network.

15. The method of claim 13, wherein the measurement report is transmitted in the reserved uplink resource one of the candidate beams selected as the target beam.

16. The method of claim 13, further comprising receiving a beam switch command from the cellular communication network.

17. The method of claim 16, wherein the beam switch command comprises a handover command.

18. A network node of a cellular communication network, the network node comprising:
    radio interface circuitry for communicating with a wireless device using one or more beams;
    processing circuitry operatively connected to the radio interface circuitry and configured to:
      identify one or more candidate beams for a beam switch;
      cause transmission of a reference signal on each of the candidate beams;
      cause reservation of an uplink resource on at least one of the candidate beams for transmission of a measurement report by the wireless device; and cause the communication with the wireless device to switch from a current beam to a target beam, wherein one of the candidate beams is selected as the target beam based on the measurement report.

19. The network node of claim 18, wherein the processing circuitry is further configured to cause the reservation of uplink resources in response to detecting a decreased signal quality.

20. The network node of claim 18, wherein the processing circuitry is further configured to cause the reservation of uplink resources in response to the network node detecting signal environment statistics of a location of the wireless device indicating that a signal-to-interference ratio of the location is below a signal-to-interference ratio threshold.

21. The network node of claim 18, wherein the processing circuitry is further configured to cause the reservation of uplink resources in response to detection of a failure of a mobility procedure.

22. The network node of claim 18, wherein the processing circuitry is further configured to cause transmission of an indication regarding the reservation of uplink resources to the wireless device.

23. The network node of claim 18, wherein the processing circuitry is further configured to cause an indication of the selected target beam to be sent in the reserved uplink resource.

24. The network node of claim 18, wherein the processing circuitry is further configured to, for a candidate beam supported by the network node:
cause transmission of the reference signal on the candidate beam by transmitting the reference signal; and
cause reservation of the uplink resource on the candidate beams by reserving the uplink resource.

25. The network node of claim 18, wherein the processing circuitry is further configured to, for a candidate beam supported by another network node:
cause transmission of the reference signal on the candidate beam by transmitting a reference signal request to the candidate beam supporting network node; and
cause reservation of the uplink resource on the candidate beams by transmitting an uplink resource request to the candidate beam supporting network node.

26. The network node of claim 18, wherein the processing circuitry is further configured to cause the communication with the wireless device to switch from the current beam to the target beam by causing transmission of a beam switch command to the wireless device.

27. The network node of claim 26:
wherein the target beam is supported by the network node; and
wherein the causing the transmission of the beam switch command to the wireless device comprises transmitting the beam switch command to the wireless device.

28. The network node of claim 26:
wherein the target beam is supported by another target beam supporting network node; and
wherein the instructions are such that the network node is operative to cause the transmission of the beam switch command to the wireless device by causing a handover of the wireless device to the target beam supporting network node.

29. The network node of claim 28, wherein the processing circuitry is further configured to cause a handover of the wireless device to the target beam supporting network node by causing the target beam supporting network node to transmit a handover command to the wireless device.

30. A wireless device adapted to communicate with a network node of a cellular communication network, the wireless device comprising:
radio interface circuitry for communicating with a wireless device using one or more beams;
processing circuitry operatively connected to the radio interface circuitry and configured to:
perform measurements of reference signals received on each of one or more candidate beams for a beam switch; and
transmit a measurement report including the reference signal measurements to the wireless communication network on reserved uplink resources on one or more of the candidate beams.

31. The wireless device of claim 30 wherein the processing circuitry is further configured to receive an indication regarding the reservation of uplink resources from the cellular communication network.

32. The wireless device of claim 30, wherein the processing circuitry is further configured to transmit the report in the reserved uplink resource of a candidate beam to be selected as the target beam.

33. The wireless device of claim 30, wherein the processing circuitry is further configured to receive a beam switch command from the cellular communication network.

34. The wireless device of claim 33, wherein the beam switch command comprises a handover command.

* * * * *